INVENTORS
JAKOB E. BODMER
JAMES L. LAUER
BY Donald R. Johnson
ATTORNEY

March 7, 1967  J. E. BODMER ETAL  3,307,918
WAVE REACTOR
Filed April 8, 1966  4 Sheets-Sheet 3

INVENTORS
JAKOB E. BODMER
JAMES L. LAUER
BY Donald R. Johnson
ATTORNEY

March 7, 1967 J. E. BODMER ET AL 3,307,918
WAVE REACTOR
Filed April 8, 1966 4 Sheets-Sheet 4

INVENTORS
JAKOB E. BODMER
JAMES L. LAUER
BY Donald R. Johnson
ATTORNEY

3,307,918
WAVE REACTOR

Jakob E. Bodmer, Media, and James L. Lauer, Penn Wynne, Pa., assignors to Sun Oil Company, Philadelphia, Pa., a corporation of New Jersey
Filed Apr. 8, 1966, Ser. No. 541,213
6 Claims. (Cl. 23—284)

This invention relates to a chemical reactor wherein certain endothermic chemical reactions may be carried out by subjecting a reactant material to one or more mechanical shock waves, thereby to produce a high temperature in such material for a very short period of time. Such a reactor may be thought of as a wave reactor, or as a wave engine or wave machine.

The present invention represents an improvement over that disclosed in the copending Bodmer application, Serial No. 349,884, filed March 6, 1964, which ripened on July 26, 1966, into Patent No. 3,262,757.

The wave reactor of this invention may be used for many different chemical reactions. For illustrative purposes, however, it will be described in connection with the preparation of hydrogen cyanide and acetylene, using carbonaceous, hydrogenous, and nitrogenous materials (e.g., a mixture of methane and nitrogen) as the reactant material.

Acetylene and hydrogen cyanide may be produced by the reaction of methane and nitrogen, provided that high temperatures are employed for the reaction, and provided also that the residence time of the reactants at the elevated temperature is very short. Such reaction may be represented by the following chemical equations:

$$2CH_4 \rightarrow C_2H_2 + 3H_2$$

and $$2CH_4 + N_2 \rightarrow 2HCN + 3H_2$$

Specifically, for the foregoing, which may in effect be thought of as a single reaction, to proceed, it is necessary that very rapid heating of the reactants from a temperature not greater than 900° F. to a temperature not less than 3200° F., be accomplished. The maintenance of the reactants too long at temperatures in the range of 900° to 3200° F. results in excessive reaction, producing undesired products such as carbon.

It is necessary that the heating through the previously-mentioned crucial range be extremely rapid. It is also necessary that upon reaching the reaction temperature, which is for example in the range of 3200° to 4000° F., the reactants be maintained at the reaction temperature for only a short time. It is further necessary that the reaction products be rapidly cooled from the reaction temperature to a temperature not substantially greater than 1600° F.

The required heating and cooling may be conveniently effected in a shock tube. A shock tube is a pipe in which a gas or a gas mixture (termed the process gas) can be heated very rapidly to very high temperatures by another gas, the driving gas, adiabatic compression being the heating mechanism. That is to say, the process involves adiabatic compression of the process gas by another gas, the driving gas, which latter works in a way similar to a mechanical piston. The adiabatic compression is the result of a shock wave produced in the tube.

The heating is followed almost immediately by rapid cooling through expansion. If there is a sequence of equivalent independent shock tube processes, the result is essentially a continuous flow process.

As described in the aforementioned application, and as will become apparent hereinafter, in a wave reactor of the type described both ends of the elongated shock tube are simultaneously exposed to a high pressure driving gas, creating in the tube two shock waves which emanate from the tube ends and proceed toward the center of the tube. Such shock waves eventually meet in the middle of the tube and are reflected. When the two compression waves (which have entered respective ends of the tube as shock waves) meet at the center (or middle) of the tube, a momentary peak pressure of about 40.4 atmospheres is reached; the pressure in the reflected wave is about 20.5 atmospheres. Thus, the impact area of the compression waves is located at the center of the tube, i.e., midway between the tube ends. The process gas is converted to product gas mainly in this region of the tube due to the high pressure or impact thereat, so that the purity of the converted or product gas is very high in this region. It is highly desirable to withdraw this high-purity product from the reactor, so that it can be utilized.

An object of this invention, therefore, is to provide, for a wave reactor employing a rotating shock tube, a construction whereby the converted product may be removed from the central region of the tube.

Another object is to provide a wave reactor of novel construction.

A further object is to provide a novel rotary porting arrangement for wave reactors which operates to properly time the withdrawal of product gas from the reactor.

The objects of this invention are accomplished, briefly, in the following manner: An elongated shock tube, mounted to rotate (during operation of the reactor) about an axis transverse to its longitudinal center line, has an aperture in its side wall which is centered on said axis of rotation. A hollow member, which rotates with the tube, has its interior constantly in communication with said aperture. A fixed gas passage leads to the exterior of the reactor, and a rotary porting arrangement operates to intermittently couple the interior of the hollow member to the fixed gas passage.

A detailed description of the invention follows, taken in conjunction with the accompanying drawings, wherein.

It has been found that it is possible to convert natural gas (methane) into acetylene, or mixtures of natural gas and nitrogen into hydrogen cyanide and acetylene, by heating the reagents quickly to temperatures above 3200° F., the heating to be almost immediately followed by cooling to a temperature not substantially greater than 1600° F., the cooling rate being comparable to the heating rate. More specifically, a mixture of nitrogen and methane can be converted to a mixture consisting of acetylene, hydrogen cyanide, hydrogen, nitrogen, and methane, at a low power plus heat cost and with good yields of acetylene, hydrogen cyanide, and by-product hydrogen. The reaction is essentially of the type expressed in the chemical equations set forth hereinabove.

As previously stated, the required heating and cooling may be conveniently effected in a shock tube, the heating being effected by a shock wave set up in the tube by a driving gas. The gas or mixture of gases which is acted upon in the shock tube may be termed the reagents, or a process gas, or a reactant mixture, or a charge gas, or a reactant material, or a process mixture.

Figure 1:
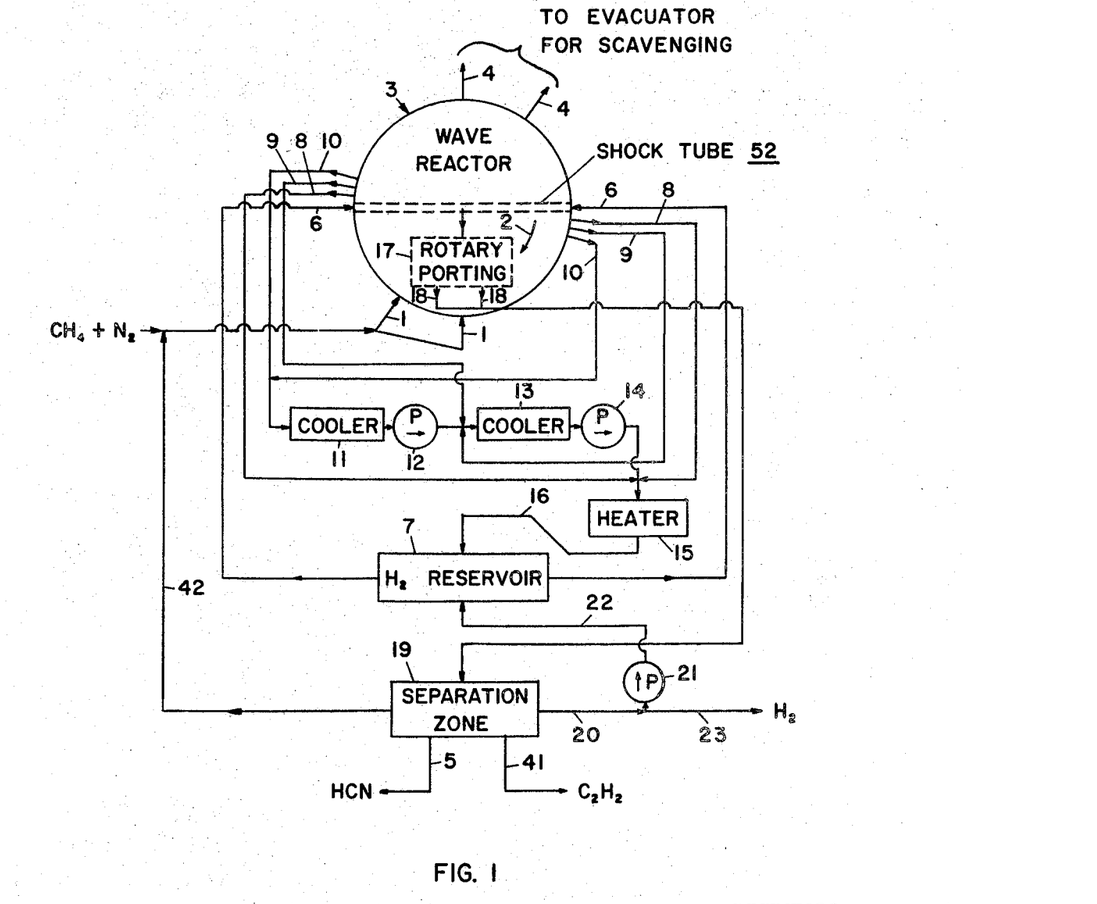
FIG. 1 is a schematic flow diagram of a wave reactor system set up for the preparation of hydrogen cyanide and acetylene from methane and nitrogen.

Referring now to FIG. 1, a mixture of nitrogen and methane (natural gas), at essentially atmospheric pressure and a temperature of about 890° F., is introduced through the manifolded conduits or pipes 1 into the reaction tube (shock tube) 52 of a wave reactor 3, which as illustrated is of generally circular configuration. This introduction takes place when one end of the rotating shock tube 52 (which, in FIG. 1, is assumed to be rotating in the direction of arrow 2 about a centrally-located axis perpendicular to the plane of the paper) comes into communication with pipes 1, and such introduction of reactant material begins a cycle of operation of the wave reactor. As subsequently more fully described, one side of the wave reactor receives reactant material, one side of the wave reactor is coupled to an evacuator to effect a scavenging process, diametrically-opposite sides receive driving gas, from diametrically-opposite sides driving gas is withdrawn, and from the center reaction products are withdrawn. In FIG. 1, the same numerals are employed at diametrically-opposite sides to designate conduits which correspond in function.

The introduction of reactant material (by means of conduits 1) into one side of the wave reactor (which is equivalent to saying into one end of the reaction tube or shock tube 52, as will later become apparent) causes a scavenging of the tube to take place simultaneously, by way of the manifolded conduits 4, which are coupled to the diametrically-opposite side of the wave reactor and to a suitable evacuator. Conduits 4 are coupled to wave reactor 3 at a location which is diametrically opposite to the coupling location of conduits 1 to the reactor. Therefore, when one end of the shock tube 52 communicates with conduits 1, the other end of this tube communicates with conduits 4. Tube 52 is assumed to be rotating, during operation of the reactor, in the clockwise direction, as indicated by arrow 2.

After shock tube 52 leaves conduits 1 and 4, its opposite ends come into alignment with the respective diametrically-opposite lines 6, in the tube position illustrated in FIG. 1. When this occurs, a driving gas, for example hydrogen at about twenty-two atmospheres absolute and 1040° F., is suddenly introduced through the lines 6 from a hydrogen reservoir 7 into diametrically-opposite sides of the wave reactor 3. Shock waves are thereby created or set up in the reaction tube 52 of the wave reactor. The methane and nitrogen (assumed to be at this time in the reaction tube, or shock tube) are adiabatically compressed, with a resulting rapid increase in temperature (to a temperature above 3200° F.). At this rather high reaction temperature the methane and nitrogen react to form hydrogen cyanide and acetylene, with hydrogen as a by-product, as indicated by the chemical reactions set out previously.

After shock tube 52 leaves lines 6, and after the adiabatic compression process is complete, the opposite ends of the tube come into alignment with the respective diametrically-opposite lines 8. At this time, a portion of the driving gas is removed from diametrically-opposite sides of the wave reactor 3, at about twenty-two atmospheres and 1040° F. Subsequently, a second portion of the driving gas is withdrawn from diametrically-opposite sides of the wave reactor through the lines 9, at about seven atmospheres and 645° F. Subsequently, the remainder of the driving gas is withdrawn from diametrically-opposite sides of the wave reactor through the lines 10, at about two atmospheres and 330° F.

The last-mentioned portion of the driving gase is cooled by passing it through a cooler 11, the two lines 10 being for example manifolded together to the inlet side of this cooler, to reduce the temperature to about 140° F. This portion of the driving gas is then compressed to about seven atmospheres by passage through a compressor 12. The resulting driving gas is admixed with the driving gas removed through the lines 9, which latter are manifolded together and to the outlet side of compressor 12; the mixture is cooled in a cooler 13 to a temperature of about 140° F. The cooled gas is compressed in a compressor 14 to about twenty-two atmospheres, and is admixed with the driving gas removed through the lines 8, which latter are manifolded together and to the outlet side of compressor 14. The mixture is introduced into a heater 15, wherein it is heated to about 1040° F. The heated driving gas at about twenty-two atmospheres is supplied through a line 16 to the reservoir 7.

Following the removal of the driving gas from the respective opposite sides of the wave reactor 3, the reaction products, together with unreacted methane and nitrogen, are withdrawn (by means of a rotary porting arrangement 17, to be later described in detail) from the central region of the shock tube 52 through the lines 18 as gas, at about 1540° F. and 0.5 atmosphere. The lines 18 are manifolded together and to the inlet of a separation zone 19. The material withdrawn via lines 18 is thus introduced into the separation zone 19 wherein a plurality of operations are carried out to obtain the respective constituents in purified form. Hydrogen, which was formed in the aforementioned chemical reactions, is separated by known means, such as diffusion through a palladium tube, and is removed through line 20. A portion of the removed hydrogen can be compressed in the compressor 21 to about twenty-two atmospheres and introduced through the line 22 into the reservoir 7, for subsequent use in another cycle of the wave reactor operation. The remainder of the product hydrogen is withdrawn via line 23 as a product of the process.

Hydrogen cyanide is separated from the remaining product gases by scrubbing with an alkaline medium, or by other known separation procedures. This gas is withdrawn via line 5 as another product of the process. After separation of the hydrogen cyanide, acetylene is separated from the remaining gases by absorption in a copper-salt solution, or by other known means for separating acetylene from gaseous mixtures. Acetylene is withdrawn via line 41 as another product of the process. The remaining (unreacted) methane and nitrogen are recycled to the wave reactor 3 through line 42, which couples into conduits 1.

A summary of the operation of the wave reactor of this invention will now be given. Assume that the straight elongated open-ended tube 52 is rotating (at high angular velocity) in the clockwise direction 2, in the plane of the paper in FIG. 1, and about an axis centered in circle 3 and perpendicular to the plane of the paper. This tube 52 would by way of example have a length substantially equal to the diameter of circle 3, and would thus move past the ends of the various lines and conduits shown schematically in FIG. 1. In actual practice, as will be described hereinafter, this straight tube is mounted in a disc which rotates (at high angular velocity) within a port ring corresponding more or less to circle 3, so that the tube ends rotate past the ends of the lines and conduits which are coupled to ports in the ring.

As one end of the tube 52 rotates past the end of conduits 1, fresh charge gas is admitted to the tube. At this same time, the other end of the tube is passing conduits 4, which lead to an evacuator; this causes the new charge gas to push out of the tube the gases left over from the previous cycle of operation, by a scavenging process. This scavenging takes place at essentially atmospheric pressure.

When the opposite ends of tube 52 thereafter come into alignment with the ends of lines 6 (which is the position illustrated in FIG. 1), both ends of the tube are thereby suddenly connected to the reservoir 7, which contains the high pressure driving gas, hydrogen. The hydrogen enters the tube with high velocity from both ends, creating two shock waves which push the process gas (already in the tube) toward the middle. This adiabatic compression compresses the process gas and brings it very rapidly to the reaction temperature, not less than 3200° F. The two shock waves, emanating from the tube ends, eventually meet in the middle and are reflected. When each of the two compression waves (which have entered respective ends of the tube as shock waves) has arrived at its respective end as a reflected wave, the compression process is complete.

After completion of the compression process, the tube contains a charge of process (now product) gas and hydrogen at high pressure, with both tube ends being closed (since, by this time, the ends of the tube have completed their travel past the ends of lines 6).

Following the compression process, both ends of the tube come into alignment with the ends of lines 8; this means that both such ends simultaneously become open to spaces of a pressure below the pressure in the tube. Now, hydrogen begins to flow out of the tube, setting up expansion waves which emanate from the respective ends of the tube and move toward the middle of the tube. The expansion described begins to rapidly reduce the temperature and pressure of the product gas. The two expansion waves, emanating from the two tube ends, eventually meet in the middle and are reflected. When each of the two expansion waves has arrived at its respective tube end as a reflected wave, the first expansion process is complete.

For a more detailed description of the compression and expansion processes previously referred to, reference may be had to the copending Hansel and Lauer application, Serial No. 430,412, filed February 4, 1965.

After completion of the first expansion process, the tube contains the original quantity of product gas, plus a fraction of the hydrogen which originally entered the tube; these contents are at a reduced pressure. At this point, both tube ends are closed, the ends of the tube having completed their travel past the ends of lines 8.

The expansion process described is repeated two more times, the tube ends being opened each time to spaces of progressively lower pressure (to wit, first the ends of lines 9 and then the ends of lines 10). Thus, a total of three expansion stages are employed. At the end of the third expansion stage, all the motive or driving hydrogen has left the tube.

After the third expansion stage, there is an expansion and discharge process during which the converted gaseous mixture (product mixture) is discharged; this expansion and discharge or extraction takes place from the center of the tube, when the rotary porting arrangement 17 operates to connect the central region of the tube 52 to the (manifolded) product discharge lines 18.

This completes one cycle of operation of the wave reactor, and shortly thereafter a new cycle begins when one end of the tube again rotates past the end of conduits 1, and at the same time the other tube end rotates past the end of conduits 4.

The admission of new reactant material (via conduits 1) into one end of the tube pushes out (via conduits 4, coupled to the other end of the tube) the materials remaining therein after the previous cycle of operation, thus providing a scavenging process.

A detailed description of the construction of wave reactor 3 will now be given, with reference to FIGS. 2–6. A stationary port ring 24 (corresponding in general outline to circle 3 in FIG. 1) is mounted in a position wherein its longitudinal axis extends substantially horizontally, and its two parallel annular faces (to wit, its front and rear faces 25 and 26, respectively, see FIG. 3) lie in parallel vertical planes. By way of example, port ring 24 may have a thickness in the axial direction of one inch, an I.D. of twelve inches, and an O.D. of 14½ inches. Ring 24 has therein a pair of diametrically-opposite, radially-extending apertures 27 which are centered on the respective opposite ends of its central horizontal diameter. Apertures 27 are approximately rectangular in outline, but have arcuate upper and lower boundaries (see FIG. 4). The longer dimension (e.g., this may be 1⅜ inches) of these approximately rectangular apertures 27 extends vertically in the plane of the paper in FIGS. 2 and 4, while the shorter dimension (e.g., this may be about 9/16 inch) extends horizontally in the plane of the paper in FIG. 4. Apertures 27 are the apertures for the driving gas (hydrogen) supply nozzles.

Figure 2:
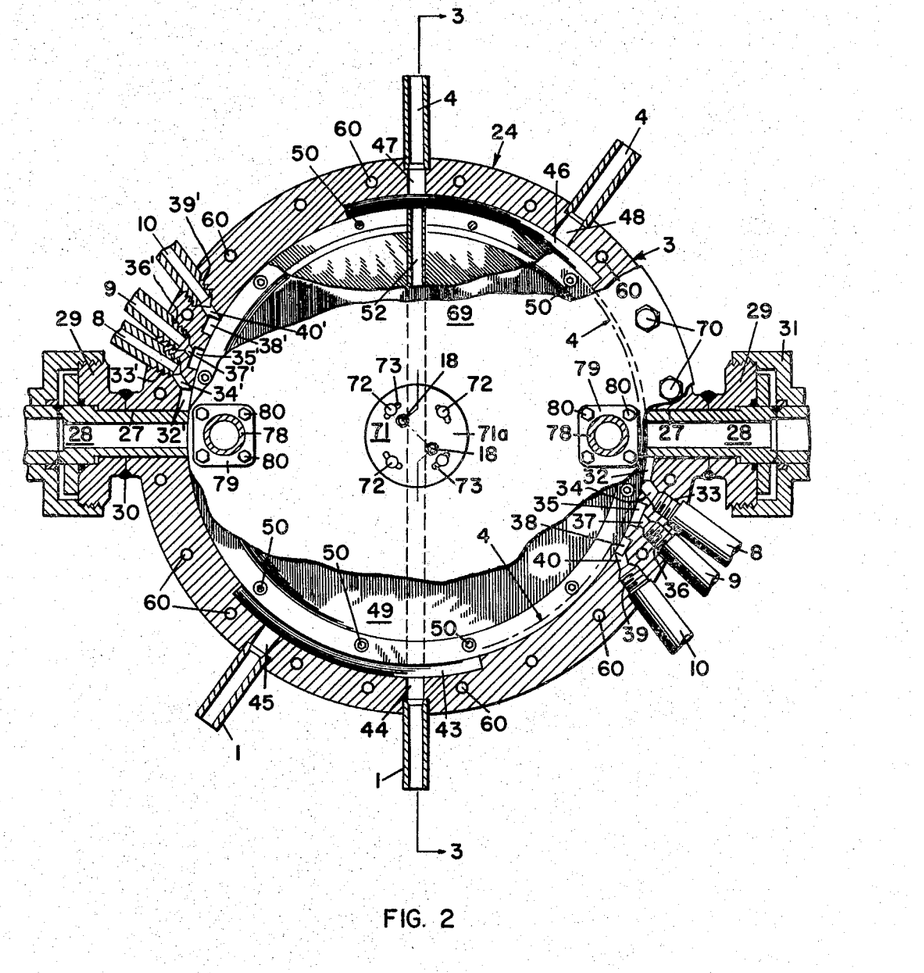
FIG. 2 is a front elevation of the wave engine of this invention, certain parts being peeled away to show the interior thereof.

In each of the apertures 27, there is mounted a respective nozzle 28. These nozzles have at their inner ends a rectangular cross-section with inside dimensions about ¼ inch by one inch, they open into the interior of the port ring 24, and they are cut off at their inner ends on a twelve-inch diameter arc, to match the curvature of the I.D. of ring 24. Toward their outer ends, each of the nozzles 28 is provided with a respective mechanical assembly which enables the nozzles to be adjusted radially with respect to the port ring, in their respective apertures 27, over a small range (e.g., 0.01 inch). Such assemblies are not shown completely herein, since they form no part of the present invention; they are disclosed and claimed in the copending application Serial No. 334,523, filed December 30, 1963, which ripened on August 2, 1966, into Patent No. 3,263,645. Such assemblies may each include an externally-threaded flange 29 secured as by welding at 30 to the outer face of ring 24, and a housing 31 having female threads at one end thereof which mate with the male threads of flange 29.

The outer ends of nozzles 28 are coupled to respective ones of the lines 6 (see FIG. 1), which in turn extend to the hydrogen (driving gas) reservoir 7. Thus, by means of the nozzles 28, the driving gas is fed to diametrically-opposite areas of the interior of ring 24, that is, to diametrically-opposite sides of the wave engine.

Figure 4:
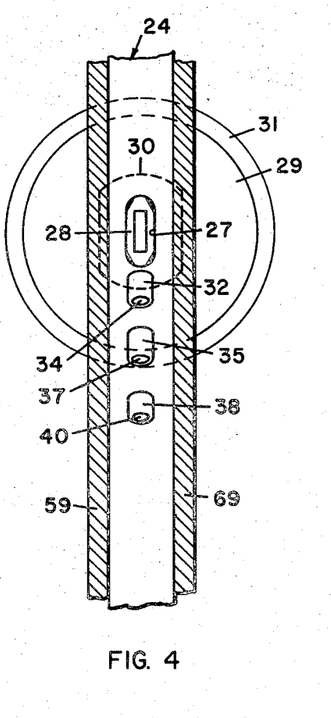
FIG. 4 is a face view, looking at the inner surface of the port ring, in the direction of arrows 4—4 in FIG. 2.

Immediately adjacent the right-hand one of the apertures 27, in the clockwise direction (when looking in the wave engine from the front thereof, as in FIG. 2), a pocket or recess 32 is cut into the inner cylindrical surface of ring 24, this pocket, like apertures 27, being centered along the axial dimension of ring 24 (see FIG. 4). From the outer face of ring 24, closely adjacent the location of recess 32, a tapped hole 33 extends into ring 24 to a certain depth, and from the bottom of hole 33 a hole 34 extends into communication with recess 32. Thus, the combination of items 32, 34 and 33 provides a port which extends entirely through ring 24, in an approximately radial direction, from the interior to the exterior thereof. One of the lines 8 has a threaded fitting on its inner end which screws into tapped hole 33; the opposite end of this line 8 is coupled into the line leading into the heater 15, as previously described in connection with FIG. 1. This line 8 thus serves as a first-stage coupling for removing driving gas from the interior of ring 24, at one side of the wave engine (to wit, the right-hand side in FIG. 2).

Diametrically opposite to pocket or recess 32, a similar pocket 32' is cut into the inner surface of ring 24, this latter pocket communicating by way of a hole 34' with the inner end of tapped hole 33' into which screws a threaded fitting provided on the inner end of the other line 8. The combination of items 32', 34', and 33' provides a port which extends entirely through ring 24, in an approximately radial direction, diametrically opposite to the port provided by 32, 34, and 33. The remote end of this other line 8 is coupled into the intake line of the heater 15, as previously described. This other line 8 thus serves as a first-stage coupling for removing driving gas from the interior of ring 24, at the other side of the wave engine (to wit, the left-hand side in FIG. 2).

Slightly clockwise (when viewed in FIG. 2) from pocket 32, a pocket or recess 35 is cut into the inner cylindrical surface of ring 24, this pocket also being centered along the axial dimension of ring 24, and, like pocket 32, being substantially rectangular in outline. From the outer face of ring 24, closely adjacent the location of recess 35, a tapped hole 36 extends into ring 24 to a certain depth, and from the bottom of hole 36 a hole 37 extends into communication with recess 35. The combination of items 35, 37, and 36 provides a port which extends entirely through ring 24, in an approximately radial direction, from the interior to the exterior thereof. One of the lines 9 has a threaded fitting on its inner end which screws into tapped hole 36; the opposite end of this line 9 is coupled into the line leading into the cooler 13, as previously described in connection with FIG. 1. This line 9 thus serves as a second-stage coupling for removing driving gas from the interior of ring 24, at one side of the wave engine (to wit, the right-hand side in FIG. 2).

Diametrically opposite to pocket or recess 35, a similar pocket 35' is cut into the inner surface of ring 24, this latter pocket communicating by way of a hole 37' with the inner end of a tapped hole 36' into which screws a threaded fitting provided on the inner end of the other line 9. The combination of items 35', 37', and 36' provides a port which extends entirely through ring 24, in an approximately radial direction, diametrically opposite to the port provided by 35, 37, and 36. The remote end of this other line 9 is coupled into the intake line of the cooler 13, as previously described. This other line 9 thus serves as a second-stage coupling for removing driving gas from the interior of ring 24, at the other side of the wave engine (to wit, the left-hand side in FIG. 2).

Slightly clockwise (viewed in FIG. 2) from pocket 35, a pocket or recess 38 is cut into the inner cylindrical surface of ring 24, this pocket also being centered along the axial dimension of ring 24, and being substantially rectangular in outline. From the outer face of ring 24, closely adjacent the location of recess 38, a tapped hole 39 extends into ring 24 to a certain depth, and from the bottom of hole 39 a hole 40 extends into communication with recess 38. The combination of items 38, 40, and 39 provides a port which extends entirely through ring 24, in an approximately radial direction, from the interior to the exterior thereof. One of the lines 10 has a threaded fitting on its inner end which screws into tapped hole 39; the opposite end of the line 10 is coupled to the intake of the cooler 11, as previously described in connection with FIG. 1. This line 10 thus serves as a third-stage coupling for removing driving gas from the interior of ring 24, at one side of the wave engine (to wit, the right-hand side in FIG. 2).

Diametrically opposite to pocket or recess 38, a similar pocket 38' is cut into the inner surface of ring 24, this later pocket communicating by way of a hole 40' with the inner end of a tapped hole 39' into which screws a threaded fitting provided on the inner end of the other line 10. The combination of items 38', 40', and 39' provides a port which extends entirely through ring 24, in an approximately radial direction, diametrically opposite to the port provided by 38, 40, and 39. The remote end of this other line 10 is coupled to the intake of the cooler 11, as previously described. This other line 10 thus serves as a third-stage coupling for removing driving gas from the interior of ring 24, at the other side of the wave engine (to wit, the left-hand side in FIG. 2.

The rotary porting arrangement 17 or rotary valve arrangement, for removing or collecting the converted process gases (i.e., the product gases) from the shock tube 52 of the wave reactor or wave machine 3, will be described hereinafter. The product gases are removed or extracted from the shock tube through an opening located midway between the tube ends, and this extraction takes place in effect after the ends of the tube have traveled (during the clockwise rotation 2 of the tube) past the respective pockets 38 and 38'.

The intake (or reactant feed, or charge) portion of the port ring 24 (to which the reactant material feed conduits 1 are coupled) may be considered as beginning at a point considerably clockwise (viewed in FIG. 2) from the clockwise end of pocket 38 and extending in a clockwise direction around to a point spaced considerably in the counterclockwise direction from the left-hand nozzle aperture 27. By way of example, the intake portion of the port ring may begin about 74° clockwise from the horizontal center line of the right-hand (viewed in FIG. 2) driving gas nozzle 28. An arcuately-elongated groove 43, extending between the two points previously mentioned, is cut into the inner cylindrical surface of ring 24, this groove being centered along the axial dimension of ring 24 and being substantially rectangular in outline. Two radially-extending holes 44 and 45 are drilled hrough port ring 24 into communication with groove 43, at angularly-spaced locations along this groove. Hole 44, for example, may extend along the vertical diameter of the port ring. The outer ends of holes 44 and 45 are threaded, and threaded fittings provided on the inner ends of the two respective conduits 1 screw into these holes. The outer ends of the two feed conduits 1 are manifolded together and to a source of supply of the gaseous reactant material, or charge material (e.g., a mixture of nitrogen and methane).

The scavenging or purging portion of the port ring 24 (to which the scavenging conduits 4 are coupled) may be considered as beginning at a point considerably clockwise (viewed in FIG. 2) from the clockwise end of pocket 38' and extending in a clockwise direction around to a point spaced considerably in the counterclockwise direction from the right-hand nozzle aperture 27. An arcuately-elongated groove 46, extending between the two points just mentioned, is cut into the inner cylindrical surface of ring 24, this groove being centered along the axial dimension of ring 24 and being substantially rectangular in outline. Two radially-extending holes 47 and 48 are drilled through port ring 24 into communication with groove 46, at angularly-spaced locations along this groove. Hole 47, for example, may extend along the vertical diameter of the port ring. Groove 46 is diametrically opposite groove 43, hole 47 is diametrically opposite hole 44, and hole 48 is diametrically opposite hole 45. Grooves 46 and 43 have the same angular length. The outer ends of holes 47 and 48 are threaded, and threaded fittings provided on the inner ends of the two respective conduits 4 screw into these holes. The outer ends of the two scavenging conduits 4 are manifolded together and to an evacuator, for scavenging.

A disc assembly 49, having an outer diameter such as to fit very closely (with a minimum running clearance) within port ring 24, is mounted for rotation at a high angular velocity (e.g., 9600 r.p.m.) within ring 24. If the disc is twelve inches in diameter, this means that the lineal speed at the outer edge of the disc is about 30,000 feet per minute. This disc assembly is mounted for rotation about a horizontal axis which coincides with the longitudinal axis of port ring 24, so that the outer cylindrical surface of the disc rotates just inside the inner cylindrical surface of the stationary port ring. Assuming a clockwise direction of rotation of the disc in FIG. 2 (as indicated in FIG. 1 by arrow 2), a point on the outer surface of the disc (such as one end of a shock tube carried by the disc) would rotate (during 360° of disc rotation) past the following port ring elements in sequence, starting from a horizontal position: left-hand nozzle 28, recess 32', recess 35', recess 38', groove 46, right-hand nozzle 28, recess 32, recess 35, recess 38, and groove 43.

The disc assembly 49 comprises two mating disc portions 49a and 49b, both of circular outer configuration, which are sandwiched together and held in assembled relation by means of an outer series of bolts 50 arranged in a circle, and an inner series of bolts (not shown) arranged in a circle of smaller diameter. Bolts 50 pass through disc portion 49b and thread into tapped holes in disc portion 49a. A squared goove is cut into each of the disc portions 49a and 49b, along a diameter thereof, such that when such two portions are assembled together, a channel of square cross-section is formed by the two squared grooves. Prior to assembly of the two disc portions, a tube 52 of square cross-section (¼-inch by ¼-inch, for example) is fitted closely into this channel, to provide a straight elongated shock tube (close to twelve inches in length) which extends diametrically of the disc assembly. Tube 52 is open at both ends, and the ends of the tube terminate closely adjacent the inner cylindrical surface of the port ring 24, as shown in FIG. 2. The tube 52 extends transversely to the horizontal axis of rotation of the disc assembly, and as the disc rotates in essentially a vertical plane, the ends of the tube 52 come into communication with the various nozzles, recesses, and grooves associated with port ring 24 in the order previously set forth, considering one end of the tube 52 at a time. In FIG. 2, tube 52 is illustrated with its center line in a vertical position, wherein one end of this tube is in communication with groove 46, and the opposite end of this tube is in comunication with groove 43. It will be realized, from what has been said previously, that the center lines of the various recesses and grooves in port ring 24 all lie in a common vertical plane.

For a more detailed description of the construction of disc assembly 49, reference may be had to Patent No. 3,235,341, dated February 15, 1966.

A hollow horizontally-extending shaft 53 (see FIG. 3) is mounted for rotation within a fixed housing 54. Housing 54, which may be cylindrical with its axis extending horizontally, provides a support for the entire wave engine, and is rigidly screwed to a suitable bracket or mount (not shown) which rests on the floor or other supporting surface. Shaft 53 is arranged to be rotated at a high rate of speed (e.g. 9600 r.p.m.) by a motor (not shown), which is coupled by means of a suitable mechanical coupling (also not shown) to the end of shaft 53 opposite to disc 49. The heads of the inner series of bolts (previously mentioned, which help to hold disc portions 49a and 48b in assembled relation) engage an integral collar 55 on one end of shaft 53, and these bolts pass through disc portion 49a and threaded into tapped holes in disc portion 49b. Thus, these last-mentioned bolts, in addition to securing the disc portions 49a and 49b together, couple disc assembly 49 to shaft 53, thereby to cause rotation of disc 49 at the same high rate of speed as shaft 53. The structure just described is shown somewhat more clearly in the previously-mentioned application Serial No. 349,884.

Figure 3:
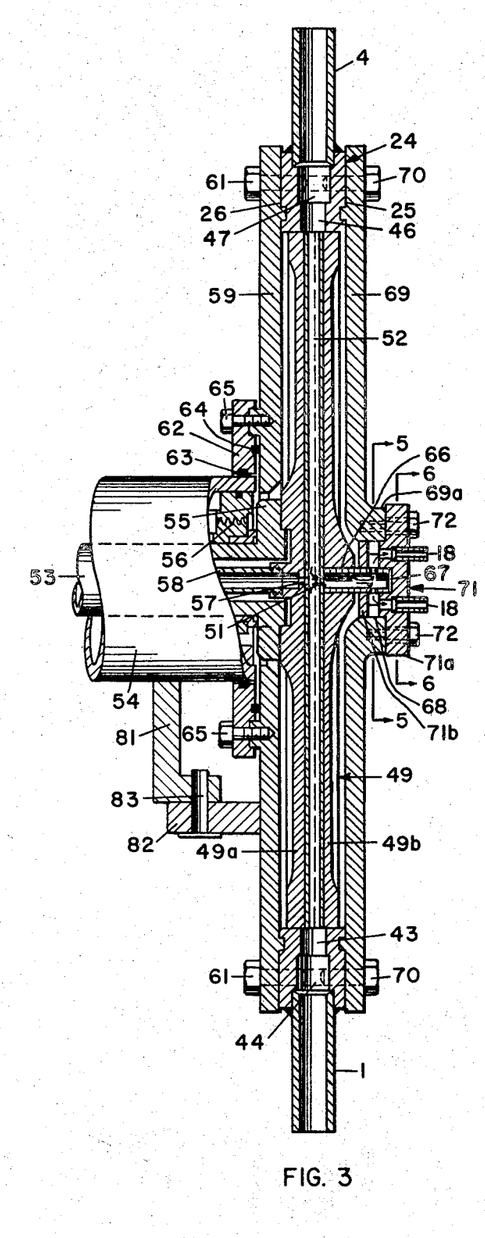
FIG. 3 is an essentially vertical section, taken on line 3—3 of FIG. 2.

Although not illustrated in FIG. 3, it is to be understood that a journal bearing is provided within housing 54, near the disc end of this housing, for journalling shaft 53 within this housing. Also, a combined journal and thrust bearing is provided for shaft 53 within housing 54, at the end of this housing adjacent the shaft driving means.

The shock tube 52, being rigidly mounted in disc assembly 49, rotates at the same high rate of speed as the disc and shaft 53. It may be seen that the disc 49 rotates essentially in a vertical plane, about the horizontal axis provided by shaft 53. The shock tube 52, of course, rotates in this same plane. A labyrinth seal (a portion of which is illustrated at 56) is used around shaft 53. In addition, other seals (not shown) may be utilized, to enhance the overall sealing around shaft 53.

For pressure measurement purposes, an aperture 57 may be provided in the rear wall of tube 52, centrally of the length thereof, and in this aperture a pressure transducer (not shown) may be inserted, to measure the pressure at the center of the shock tube as the latter rotates. The transducer is so constructed that it in effect fills in the aperture 57, and forms a continuation of the tube wall, for gas flow in the shock tube. The pressure transducer leads may be taken off through a conduit 58 which extends through the bore of hollow shaft 53 and one end of which threads into a threaded fitting provided at the center of the rear face of disc assembly 49. Conduit 58, and the pressure transducer also, rotate with disc assembly 49.

A rear cover plate 59, which is more or less disc-shaped, is secured to the rear face 26 of port ring 24. Cover plate 59 is attached in any suitable manner to housing 54, in order to provide proper support for the principal stationary parts of the wave engine (such as the port ring, etc.). By way of example, three two-piece lugs (one of which is illustrated in FIG. 3) may be provided, one piece 81 of each lug being rigidly secured to housing 54 and the other piece 82 of each lug being rigidly secured to plate 59. The two pieces of each matched lug 81, 82 are rigidly secured to each other through a radial pin 83.

For securing cover plate 59 to port ring 24, a circular array of longitudinally-extending tapped holes 60 is provided in ring 24. Bolts 61 pass through plate 59 and threaded into the respective holes 60, to secure rear cover plate 59 to port ring 24. Cover plate 59 has a substantially circular opening at its center, of a diameter such as to clear the rotating collar 55. It is pointed out that the axial dimension of the thinner, web-like, radially-outer portion of disc assembly 49 is appreciably less than that of port ring 24, so that there is clearance space (for rotation of disc 49) between the front or inner face of cover plate 59 and the rear face of disc 49. Also, sufficient clearance is of course provided between the radially outer edge of disc 49 and the radially inner edge of ring 24.

A seal ring 62 is used to seal the space between the inner end of housing 54 and the rear face of cover plate 59. Ring 62 carries in its inner cylindrical surface a gasket 63 (for example, an O-ring) which provides a seal against the outer cylindrical surface of housing 54, and carries in its front circular face a gasket 64 (for example, an O-ring) which provides a seal against the rear face of cover plate 59. Seal ring 62 is held in position by a plurality of bolts 65 which pass therethrough and thread into tapped holes provided in cover plate 59.

Figure 5:
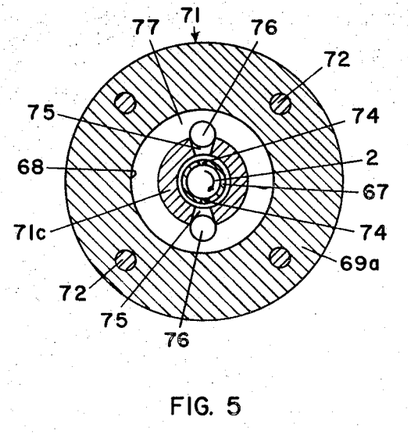
FIG. 5 is a vertical section, drawn on an enlarged scale, taken on line 5—5 of FIG. 3.
Figure 6:
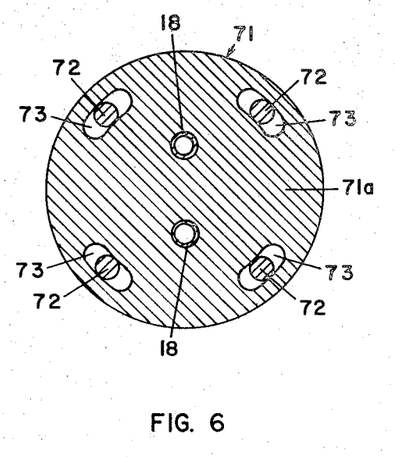
FIG. 6 is a vertical section, drawn on an enlarged scale, taken on line 6—6 of FIG. 3.

Refer now to FIGS. 3, 5, and 6. According to this invention, product is removed from the central region of the shock tube 52, and this is made to occur, on a time basis, following the removal of driving gas through the third-expansion-stage lines 10.

An opening 51 is provided in the front wall of tube 52, centrally of the length thereof, or midway between the ends of the shock tube. By way of example, opening 51 may be of rectangular configuration. An axial bore 66 is drilled entirely through the central hub of disc portion 49b into the groove in which tube 52 fits, and sealed into this bore is a tube 67 which extends outwardly from the front face of disc portion 49b. Tube 67 is closed at its outer end, and the open inner end of this tube communicates through the opening 51 with the interior of shock tube 52. Thus, gas can flow from the interior of the shock tube 52 via opening 51 into tube 67. The center line of tube 67 and the center line or axis of the disc rotor 49 must be in perfect alignment.

The front cover plate 69 is provided with a central outwardly-facing boss portion 69a which surrounds a central axitl bore 68, the boss portion 69a having an outwardly-facing annular mounting face.

An insert member, denoted generally by numeral 71, is mounted in bore 68. Member 71 has a disc-like outer portion 71a which overlies the annular mounting face on boss portion 69a and is secured thereto by a plurality of bolts 72, each of these bolts passing through a respective arcuately-elongated slot 73 (see FIGS. 2 and 6) in portion 71a and threading into a respective tapped hole provided in boss portion 69a. The slots 73 allow a limited amount of angular adjustment of the insert 71 with respect to front cover plate 69, for a reason which will be explained hereinafter.

Insert 71 has an inner washer-like portion 71b whose outer periphery fits tightly in bore 68 and whose inner diameter provides a close running clearance with the outer surface of tube 67. Insert 71 also has, just in front of portion 71b, an intermediate slotted annular portion 71c (see FIG. 5) whose inner diameter also provides a close running clearance with the outer surface of tube 67. The outer diameter of portion 71c is such as to leave an annular space 77 between such diameter and the wall of bore 68. The outer portion 71a of insert 71 has a circular recess in its inner face which provides a close running clearance with the outer surface of tube 67 and with the outer, closed end of tube 67. The aforementioned close running clearances between the tube 67 and the portions 71a–71c of insert 71 (in this connection, it will be remembered that insert 71 is stationary, and tube 67 rotates with disc 49) are provided to keep the internal leakage small. This means that the center lines of the rotor or disc 49, the tube 67, and the insert 71 have to be in perfect alignment.

Near its outer end, and in vertical alignment with the insert portion 71c, tube 67 has in its side wall a pair of diametrically-opposite slots or apertures 74. The intermediate annular portion 71c has therein a pair of diametrically-opposite ports 75 which extend diametrically of portion 71c and each of which is provided by a respective radial slot cut into insert portion 71c. By way of example, the angular width of each of the ports 75 may be about 35°. As tube 67 rotates in the direction of arrow 2, the apertures 74 are adapted to come into registry with the respective ports 75, the registry position being illustrated in FIG. 5. A pair of diametrically-opposite axial bores 76 extend through the outer portion 71a of the insert, these bores being aligned with respective ones of the ports 75, as shown in FIG. 5. The outer ends of the bores 76 are threaded, and threaded fittings provided on the inner ends of the two respective lines 18 screw into these bores. The outer ends of the two "product out" lines 18 are manifolded together (see FIG. 1) and to the inlet of the separation zone 19 previously mentioned.

The elements 67, 71, and 74–76 together comprise the rotary porting arrangement or rotary valve arrangement 17 which was previously referred to. In essence, the rotary porting arrangement is composed of the rotating tube 67 and the stationary insert 71. Assuming that the disc 49 (and consequently the tube 67) is in the position illustrated in FIGS. 3 and 5, the converted gas (i.e., the product gases) leaves the central region of the shock tube 52 by way of opening 51, and enters tube 67. After it has entered this latter tube, it flows from left to right therein, and leaves this rotating tube through the two apertures 74. From here, the gas enters the ports 75 in the stationary insert 71, and then escapes to the outside (i.e., to lines 18) through the axial bores 76. The described path of flow of the gas is indicated by the various flow arrows in FIG. 3.

Referring to FIG. 5, it is pointed out that the "product out" gas flow from the shock tube, set forth in the preceding paragraph, takes place only during the time that apertures 74 in the tube 67 are in alignment with the ports 75. It may be noted that the two port openings 75 in insert 71 comprise the timing elements for the "product out" step of the overall operation or process. With the disc (and tube 67) rotating at full speed, the ports 75 begin to open (i.e., begin to communicate with the central region of shock tube 52, via apertures 74 in tube 67) about 30° after the driving gas has entered the shock tube. This "30°," of course, refers to the rotation of disc 49. This is compatible with the geometrical configuration illustrated in FIG. 2, wherein the clockwise end of pocket 38 is about 30° clockwise from the ((horizontal) center line of the right-hand nozzle 28, and the clockwise end of pocket 38' is about 30° clockwise from the center line of the left-hand nozzle 28. That is to say, the counterclockwise ends of the ports 75 are about 30° off the horizontal, in either direction; in this connection, note the somewhat skewed direction of the central portion of section line 3—3, in FIG. 2. Beginning 30° after the compression waves have entered the shock tube 52, the ports 75 remain "open" (to the interior of the shock tube) during the next 35° of one revolution of the disc 49 (which represents the extraction or "product out" time), since the angular width of each of the ports 75 is 35°.

The four arcuately-elongated slots 73 provide a limited amount of angular adjustment of insert 71 with respect to cover plate 69, and thus a limited amount of angular adjustment of the ports 75 with respect to some fixed datum, such as the center line of the nozzles 28. This adjustment feature allows the converted gas (product gases) to be withdrawn from various phases of the expansion and discharge (product out) process.

Refer again to FIG. 2. A pair of diametrically-opposite vent pipes 78 are sealed through the front cover plate 69, these pipes being centered on a horizontal diameter and being located near the outer periphery of the disc assembly 49. Pipes 78 are welded each to a respective square mounting plate 79 which is in turn secured by bolts 80 to the front cover plate 69. The inner ends of the pipes 78 communicate with the space between the disc 49 and the front cover plate 69, while the outer ends of these pipes vent to the atmosphere. Pipes 78 thus serve to vent the front space inside the housing, which is formed by the cover plates, to the atmosphere.

A pair of vent pipes, similar to pipes 78 but not shown in the drawings, are sealed through the rear cover plate 59, to vent the rear space inside the housing to the atmosphere.

As previously described, the straight open-ended shock tube 52 rotates (in a clockwise direction in FIG. 2) at high angular velocity, essentially in the plane of the paper, about an axis (the center line of shaft 53) perpendicular to the plane of the paper, the disc rotating within the port ring 24. The ends of the tube 52 thus rotate past the various nozzles, pockets, and grooves associated with the port ring 24, as previously described. As the open ends of the tube 52 rotate past the various nozzles, grooves, and pockets associated with the port ring 24, these ends of course come into communication with such nozzles, grooves, and pockets, in the definite order of succession which was described previously. The action occurring during one-half revolution (180° of rotation) of the disc 49 and the shock tube 52 will now be described in detail. As previously stated, disc 49 is assumed to be rotating in the clockwise direction in FIG. 2.

As one end of the tube 52 comes into communication with groove 43 (by rotating past the counterclockwise end of this groove), process gas begins to flow into this end of the tube, since said groove is coupled to the charge or reactant feed conduits 1. This flow continues to take place throughout the travel of this end of the tube past groove 43. This flow comes about because of the following pressure differential: The product withdrawal (from the previous cycle of operation) has taken place at about 0.5 atmosphere (as previously stated), while the immediately-following charge reintroduction is at about one atmosphere (as also previously stated).

At the same time that the aforesaid one end of tube 52 comes into communication with groove 43, the other end of this tube comes into communication with groove 46 (which is diametrically opposite groove 43), by rotating past the counterclockwise end of groove 46. Since groove 46 is coupled to the scavenging or purging conduits 23, the new charge coming in via conduits 1 pushes out the materials remaining in the tube 52 after a previous cycle of operation of the wave engine, to scavenge the tube. The scavenging of the tube continues throughout the travel of said other end of the tube past groove 46. In this connection, it is pointed out that the grooves 43 and 46 have exactly the same angular length or extent, and are diametrically opposite each other; the travel of said one end of tube 52 past groove 43 thus coincides with the travel of said other end of the tube past groove 46.

It may be noted that, at the moment or instant (during the rotation of disc 49) illustrated in FIG. 2, one end of tube 52 is in communication with groove 43, and the other end of this tube is in communication with groove 46.

Following the travel of said one end of shock tube 52 (which may be thought of as the lower end of the tube in FIG. 2) past the clockwise end of groove 43, this end of the tube comes into sudden communication with the interior of the left-hand nozzle 28; at this same instant, said other end of the tube comes into sudden communication with the interior of the right-hand nozzle 28. Both ends of the shock tube 52 are thereby suddenly (and simultaneously) connected to the reservoir of high pressure driving gas (hydrogen), by way of the lines 6 (FIG. 1) which are coupled to the outer ends of these nozzles and also to the hydrogen reservoir 7. Two shock waves are thereby created, as previously described. The process gas (reactant material) in the tube 52 is thereby compressed and brought very rapidly to the reaction temperature. The adiabatic compression process is completed by the time the ends of the tube have completed their travel past the nozzles 28.

Said one end of the shock tube thereafter comes into communication with pocket 32', and simultaneously said other end of the shock tube comes into communication with pocket 32. Pocket 32' communicates with the left-hand line 5, and pocket 32 with the right-hand line 5. Expansion waves are set up, as previously described. The first expansion process is completed by the time the ends of the shock tube have completed their travel past the clockwise ends of the respective recesses or pockets 32' and 32.

Said one end of tube 52 thereafter comes into communication with pocket 35', and simultaneously said other end of tube 52 comes into communication with pocket 35. Pocket 35' communicates with the left-hand line 6, and pocket 35 with the right-hand line 6. Expansion waves are again set up, to begin a second expansion process, which latter is completed by the time the ends of the shock tube 52 have completed their travel past the clockwise ends of the respective recesses or pockets 35' and 35.

Said one end of the shock tube thereafter comes into communication with pocket 38', and simultaneously said other end of the shock tube comes into communication with pocket 38. Pocket 38' communicates with the left-hand line 7, and pocket 38 with the right-hand line 7. Expansion waves are again set up, to begin a third expansion process, which latter is completed by the time the ends of the tube 52 have completed their travel past the clockwise ends of the respective recesses or pockets 38' and 38. At the end of this third expansion process, all the motive or driving-gas hydrogen has left the shock tube.

The central region of shock tube 5 thereafter comes into communication with ports 75 (due to the coming into alignment of apertures 74 with these ports). One of the ports 75 communicates with one of the "product out" lines 18, and the other port communicates with the other "product out" line 18. Discharging of product gases now takes place from the central region of the shock tube 52, via shock tube opening 51, tube 67, apertures 74, ports 75, bores 76, and lines 18. This discharging continues until the time at which apertures 74 pass the clockwise ends of the respective ports 75.

After the instant at which apertures 74 pass the clockwise ends of the respective ports 75, said one end of the shock tube comes into communication with groove 46, and simultaneously said other end of the shock tube comes into communication with groove 43. Now, the shock tube has rotated through 180° and the action previously described begins to repeat (thereby to begin a new cycle of operation of the wave engine or wave reactor). The same action as previously described then repeats, except that now the ends of tube 52 are reversed, the "one" end now becoming the "other" end and the "other" end now becoming the "one" end. It may therefore be seen that tube 52 is double-ended (both ends thereof being open), and that there are two complete cycles of operation of the wave engine per complete (360°) revolution of the disc 49.

The invention claimed is:

1. In a wave reactor, a disc-like rotor carrying an elongated shock tube extending transversely to the axis of the rotor and along a diameter of the disc, the rotor axis passing through the midpoint of the longitudinal center line of said tube; a stationary port ring closely surrounding said rotor, means providing a driving gas inlet in said ring, said ring having therein a driving gas outlet and also having therein a reactant gas inlet; said rotor being rotatable to bring one end of said tube successively into communication with said reactant gas inlet, said driving gas inlet, and said driving gas outlet; said tube having in a side wall thereof a restricted aperture which is centered on said axis; and means operating to extract product gases from said tube, by way of said aperture, during a portion only of a complete revolution of said tube.

2. Combination as defined in claim 1, wherein said last-mentioned means comprises a hollow member the interior of which is in constant communication with said tube via said aperture, said member rotating with said tube during operation of said reactor, means providing a fixed gas passage leading to the exterior of the reactor, and means operating, during a portion only of a complete revolution of said member, to couple the interior of said member to said passage.

3. Combination as defined in claim 1, wherein said last-mentioned means comprises a rotary porting arrangement having an element which rotates with said tube, the porting arrangement operating to couple the interior of said tube to a fixed gas passage during said portion of said complete revolution.

4. Combination as defined in claim 2, wherein said last-mentioned means includes a stationary grooved ring closely surrounding said member; said member having therein an opening which cooperates with the groove in said ring.

5. Combination as described in claim 4, wherein the groove in said ring extends over only a small portion of the 360° circumference of the ring, said groove communicating with said gas passage.

6. Combination as defined in claim 2, wherein said last-mentioned means comprises a rotary porting arrangement operating to couple the interior of said member to said passage during said portion of said complete revolution.

References Cited by the Examiner

UNITED STATES PATENTS 2,902,337  9/1959  Glick et al. _____________ 23—1
2,958,716  11/1960  Lahr et al. _____________ 23—1 X MORRIS O. WOLK, *Primary Examiner.*

JAMES H. TAYMAN, JR., *Examiner.*